United States Patent [19]

Redd et al.

[11] Patent Number: 5,730,912
[45] Date of Patent: Mar. 24, 1998

[54] METHOD OF THE ENCAPSULATION OF LIQUIDS

[75] Inventors: Randall Vann Redd, Wilmington, Del.; Joseph L. Sell, Beaverdam, Wis.

[73] Assignee: M-Cap Technologies International, Wilmington, Del.

[21] Appl. No.: 656,118

[22] Filed: May 30, 1996

[51] Int. Cl.$^6$ .................................. B05D 1/00; B05D 1/02
[52] U.S. Cl. ........................... 264/4; 264/4.3; 264/4.33; 264/4.6; 264/4.1
[58] Field of Search ........................... 264/4, 4.3, 4.33, 264/4.6, 4.1

[56] References Cited

U.S. PATENT DOCUMENTS

| | | | |
|---|---|---|---|
| 4,054,465 | 10/1977 | Ziobrowski | 106/298 |
| 4,533,616 | 8/1985 | Ohsaki et al. | 430/110 |
| 4,579,779 | 4/1986 | Ohno | 428/402.2 |
| 4,746,513 | 5/1988 | Smith | 424/408 |
| 4,954,285 | 9/1990 | Wierenga et al. | 252/174.11 |
| 5,154,842 | 10/1992 | Walley et al. | 252/8.6 |
| 5,207,933 | 5/1993 | Trinh et al. | 252/8.6 |
| 5,338,809 | 8/1994 | Bell et al. | 426/650 |

OTHER PUBLICATIONS

Fedorov et al., Translation of SU 1669537 A1, Aug. 1991.
Yoshimoto et al., Translation of JP Hei 1–113436, May 1989.

*Primary Examiner*—Jeffrey C. Mullis

[57] ABSTRACT

The invention is directed to a method for the encapsulation of liquids within a continuous impervious coating of thermoplastic material. The method is carried out with continuous agitation during which the adsorbent and adsorbate are coated with a plurality of sprayed layers of thermoplastic coating material while maintaining the adsorbent in free-flowing powder consistency during the coating steps. The method is especially advantageous for the encapsulation of volatile liquids.

17 Claims, No Drawings

METHOD OF THE ENCAPSULATION OF LIQUIDS

FIELD OF THE INVENTION

The invention is directed to a method for the encapsulation of liquids within a continuous impervious coating of thermoplastic material. In particular, the invention is directed to a method for the encapsulation of volatile liquids in which quite thin impervious coatings are attainable.

BACKGROUND OF THE INVENTION

The encapsulation of liquids to form particulate solids can frequently be carried out by pan drying or spray coating. However, volatile liquids cannot ordinarily be encapsulated by such simple methods because of their fugitive character. Therefore, it is frequently necessary to carry out this function by first adsorbing the volatile material onto to an adsorbent solid material and then encapsulating the adsorbent containing the volatile adsorbate. A problem frequently encountered with such methods, however, has been how to encapsulate the adsorbent with a reliably continuous coating which is both uniform and not excessively thick. It is, of course, preferred that such coatings be relatively thin so that they can be dissolved or melted off readily and uniformly at preselected process conditions.

SUMMARY OF THE INVENTION

The invention is directed to an improved method for the encapsulation of liquids which is particularly advantageous for encapsulating volatile liquids. Therefore, the invention is directed to such method comprising the sequential steps of:

(1) providing finely divided particles of adsorbent solids having the capability of adsorbing the volatile liquid to a level greater than 20% of the weight of the adsorbent at a preselected temperature;

(2) with continuous agitation, admixing with the adsorbent solid particles a quantity of liquid in excess of 20% by weight of the adsorbent to effect adsorption of substantially all the volatile liquid onto the particles during which the admixture may acquire paste consistency;

(3) upon completion of addition of the volatile liquid, continuing agitation of the particles for a time sufficient as may be necessary fully to adsorb the liquid and to convert the adsorbate-containing particles to free-flowing powder consistency;

(4) while maintaining the temperature of the adsorbent particles at a level below the melting point of the thermoplastic coating material, continuing agitation of the adsorbent particles by which surfaces of the free-flowing powder are repetitively exposed and, in a plurality of steps, intermittently spraying onto the exposed surfaces of the adsorbent particles a molten thermoplastic coating material (a) in a total amount sufficient to form a continuous coating thereon (b) at a rate such that the particles remain free-flowing and (c) the temperature of the particles and time interval between spraying cycles being sufficient to effect solidification of the coating material on the particles before any further spraying.

DETAILED DESCRIPTION OF THE INVENTION

A. Adsorbent

A wide variety of solid adsorbent materials can be used so long as they are chemically inert with respect to the adsorbate and the coating material and have the capacity to adsorb at least 20% of their weight of the volatile liquid with which they are used. In particular, they must be capable of such level of adsorption at ambient temperature conditions and at the temperatures encountered in mixing such solids with adsorbate materials. It is preferred that the adsorbent be capable of adsorbing at least 50% of its weight of whatever volatile liquid is chosen. It is also preferred that these adsorbents be of particulate powder consistency in which the particles can pass through a 250 standard mesh screen and still more preferably through a 300 standard mesh screen. Such adsorbent materials include amorphous silica, silica gel, various clays, starch, ground corn cobs, soya proteins, flour, maltodextrins, dendritic salt and dietary fibers. Because of its high adsorption capacity (1 to 2 times its weight), amorphous silica is particularly preferred for use in the invention.

B. Adsorbate

A very wide variety of materials can be encapsulated in accordance with the method of the invention; however, the invention has been found to be most advantageous with respect to volatile materials. As used herein, the term "volatile liquid" refers to liquids which have a vapor pressure of 200 mm Hg or higher at whatever conditions they may be exposed to during storage, processing and handling. As indicated above in the discussion of adsorbents, the liquids which can be used in the invention, whether volatile or not, must be chemically inert with respect to the adsorbent with which they are used. An important class of adsorbate materials for which the invention is especially advantageous is flavoring materials, which frequently are volatile compounds or mixtures thereof. Such materials include diacetyl (butter flavoring), cinnamon oils, smoke flavoring and alcohol solutions of various flavors which may not themselves be volatile.

C. Impervious Coating Material

Coating materials suitable for use in the invention must be thermoplastic and must be inert with respect to the underlying adsorbent and adsorbate. Petroleum waxes, for example, are frequently used in this method. Hydrogenated vegetable oils such as soybean oil and cottonseed oil are frequently used as well. Other coating materials include mono- and di-glycerides, bees wax, paraffin wax, microcrystalline wax, sunflower seed fats, organic acids, synthetic waxes, hydrogenated castor oil, varnish resin, lacquers and poly(vinyl alcohol), hydrogenated tallow and animal fats, substituted bees wax, synthetic paraffin wax, hydrogenated cottonseed oil, stearates, glyceral tristearate, crystalline polyethylene, shellacs and poly(ethylene glycol). It will be recognized that when the adsorbate materials are to be used in food applications, both the adsorbent and impervious coating material must be safe for human consumption. In the United States, they must comply with appropriate regulations of the U.S. Food & Drug Administration.

It will be recognized by those skilled in the art that one or more additional coatings can be applied to those particles that have first been encapsulated by the above-described method of the invention. In those situations where continuity of such additional coatings is not critical, the additional coating can be applied in a single spraying step. If, however, it is desired to limit the thickness of the subsequent coating and/or to obtain more uniformity of thickness and continuity, the secondary coating can be applied in a plurality of spraying steps in the manner of the primary thermoplastic coating. Although in most applications the coatings will be applied by spraying the molten thermoplastic coating material, it will be recognized that solutions of the coating material can be sprayed on in the same manner. In that case, the rate of spraying and interval between spraying steps will need to be adjusted to allow complete evaporation of the solvent.

D. Operating Variables

An important aspect of the invention is that the encapsulation must be carried out in such manner that the final product is of powder consistency and does not contain lumps having paste-like or semi-solid consistency. This goal is attained during both spraying steps by adjusting the rate at which the liquids are applied. Thus, if the admixture incurs lumps or becomes paste-like during spraying of the volatile material onto the adsorbent, the admixture can be returned to free-flowing powder consistency by slowing down the rate of liquid addition or by stopping liquid addition for a short time while continuing mixing. Likewise, the problem can be handled in the same manner during spraying of the thermoplastic coating on to the adsorbent containing adsorbed volatile material.

The method of the invention can be readily carried out in conventional mixing equipment that is used for liquid-solid systems. In general, batch mixing equipment such as stationary tank mixers, shear bar mixers, helical blade mixers, and double-arm kneading mixers can be used. Double-arm mixers, such as sigma mixers, have been found to be particularly satisfactory for the practice of the invention. Such mixers provide thorough, uniform mixing at a controlled rate of shear, yet blade clearance can be adjusted to avoid fracture of the finely divided particles.

Because of the necessity of monitoring the mixing process as described above, it is preferred to employ mixers in which the physical state of the material being mixed can be observed visually and periodic additions can be made as needed.

It is preferred to carry out the initial adsorption step at a comparatively low temperature in order to get a high degree of adsorption into the pores of the adsorbent while minimizing the loss of volatile materials. In general, refrigeration is not necessary and the adsorption can usually be carried out at ambient temperatures. As noted above, it is important that whatever amount of volatile material is added to the adsorbent be completely adsorbed in order that the adsorbent/adsorbate mixture can be maintained in free-flowing powder form before proceeding to application of the thermoplastic coating.

The spraying steps, in which the thermoplastic coating is applied to the adsorbent/adsorbate particles, are carried out in such manner that the coating is heated to above its melting point and sprayed onto the adsorbent in molten form. At the same time, the temperature of the adsorbent substrate must be maintained below the melting point of the thermoplastic coating in order to get rapid solidification of the coating as it is sprayed on the particles. Thus, the coating material is sprayed onto the adsorbent in a plurality of steps in which a thin coating is applied which is rapidly solidified by contact with the adsorbent before the next coating step. It is preferred that the temperature of the adsorbent particles during the spray coating be at least 5 degrees F. below the melting temperature of the molten coating material in order to get rapid solidification of the coating material. However, it is also preferred that the temperature differential between the spray and substrate not exceed 20 degrees F. in order that the coating material not crystallize too rapidly. In many instances, a temperature differential of 10 degrees F. has been optimum. Nevertheless, it is preferred to maintain the temperature of the mixing step low in order to reduce any tendency of the admixture to revert to paste consistency during liquid addition.

Surprisingly, it has been found that an important variable in carrying out the spraying step is the droplet size of the spray. In particular, if the average droplet size is too large, i.e. above about 750 micrometers, particle aggregation becomes excessive. On the other hand, if the average droplet size is too small, i.e. below 100 micrometers, there is insufficient penetration of the droplets into the particle mass. An average droplet size of 200–400 micrometers is preferred.

In carrying out the spraying step with a given spray nozzle, droplet size is related directly to nozzle pressure. This is illustrated by the following data:

| Nozzle Designation | Pressure (p.s.i.) | Avg. Droplet size (micrometers) |
|---|---|---|
| A | 30–60 | 270–330 |
| B | 30–60 | 240–360 |
| C | 10–60 | 300–350 |

The thickness of the thermoplastic coating is, of course, a direct function of how much coating material is sprayed onto the substrate adsorbent. It has been found that the coating material should constitute no more than about 50% of the adsorbent/adsorbate weight in order that the coated adsorbent can be retained in free-flowing form. However, at least 5% by weight coating is needed to assure that the coating is continuous. It is, nevertheless, still further preferred that the amount of coating material constitute 20–40% of the adsorbent weight. In many instances, the optimum amount of coating material has been found to be 25–30% by weight.

In order to assure continuity of the coating of thermoplastic material when applying thin coatings, it is necessary to carry out the initial coating process in at least two steps and preferably three. It has not yet been found to be necessary or advantageous to carry out the coating operation in more than four or five steps.

As mentioned above, the time between spraying steps should be sufficient to effect solidification of the coating material. Typically, each spraying cycle is of 10–15 seconds duration with about five minute intervals between the spraying cycles to facilitate cooling.

EXAMPLES

Example 1

In this example, diacetyl butter flavoring was encapsulated within a coating of paraffin wax. The product was intended for use with microwaved popcorn and was designed to effect release of the flavoring at a temperature above 150 F., but below the popping temperature of the corn. In particular, 402 g of Syloid 74 (a synthetic amorphous silica made by Davison Chemical Division of W. R. Grace & Co., Baltimore, Md.) was mixed with 198 g of diacetyl liquid to effect adsorption of the diacetyl onto the silica. During the liquid addition, the admixture became paste-like in consistency, but resumed powder consistency as mixing was continued after completion of the diacetyl addition. The adsorbent containing the adsorbed diacetyl was then placed into a covered, jacketed sigma mixer during which it was mixed and heated to a temperature of 35 C. Blade speed was 70 rpm. During the heating step, 320 g of Shell 650 paraffin wax (Shell Chemical Company, Houston, Tex.) was heated to 80 C. to melt the wax. While running the sigma mixer containing the adsorbent and adsorbed diacetyl at medium speed, the wax was added and coated on the adsorbent in three equal spraying steps. A low pressure spray nozzle having an orifice of 0.76 mm was used. Between the wax additions, an interval of time was provided in order that the wax added in the previous step would fully solidify to form a continuous coating. The rate of spraying was controlled to enabled the admixture to retain powder consistency throughout the spraying steps. Upon completion of spraying the wax onto the particles in three stages as mixing was continued, a secondary coating of 80 g of fully hydrogenated soybean oil (low IV soybean oil flake, Kraft Food Ingredients, Memphis, Tenn.) was sprayed onto the particles in a single step. After the hydrogenated soybean oil was applied, the powdery mixture was screened to remove any product clumps. The screened powder was then packaged and the removed clumps were recycled to the second coating step.

The product made in this manner is capable of retaining the diacetyl for up to four hours at 60 C. and releases the flavoring material at a temperature above 66 C. when it is heated in a microwave. Shelf life of the encapsulated product in contact with unpopped popcorn containing 5% moisture is at least three months.

The above-described product was then subjected to both moisture and thermal stability testing. In the moisture stability test, 25 mg of product was admixed with 1.0 g of Super Wesson Oil (partially hydrogenated vegetable oil), subjected to exposure at 120 F. for 3 hours, after which it was held at 65% relative humidity at ambient temperature for 21 days over saturated sodium nitrite. The product retained at least 31% by weight of its diacetyl content.

In the thermal stability test, 25 mg of product was admixed with 1.0 g of the hydrogenated vegetable oil and held at 49 C. for 6 hours, during which the product retained more than 90% by weight of its diacetyl content. When free diacetyl was admixed with the hydrogenated vegetable oil and exposed to similar conditions, only about 10% by weight of the diacetyl was retained. These tests indicate that the product of the invention will be quite stable during prolonged shelf storage.

What is claimed is:

1. A method for the encapsulation of volatile liquids within a continuous impervious coating of thermoplastic material comprising the steps:

(1) providing finely divided particles of adsorbent solids having the capability of adsorbing the volatile liquid to a level greater than 20% of the weight of the adsorbent at a preselected temperature;

(2) with continuous agitation using batch mixing equipment selected from stationary tank mixers, shear bar mixers helical blade mixers and double blade mixers, admixing with the adsorbent solid particles a quantity of volatile liquid in excess of 20% by weight of the adsorbent to effect adsorption of substantially all the volatile liquid onto the particles during which the admixture may acquire paste consistency;

(3) upon completion of addition of the volatile liquid, continuing the agitation of the particles for a time sufficient as may be necessary to convert the adsorbate-containing particles to free-flowing powder consistency;

(4) while maintaining the temperature of the adsorbent particles at a level below the melting point of the thermoplastic coating material, continuing further the agitation of the adsorbent particles using said batch mixing equipment by which surfaces of the free-flowing powder are repetitively exposed and, in a plurality of steps, intermittently spraying onto the exposed surfaces of the adsorbent particles a molten thermoplastic coating material (a) in a total amount sufficient to form a continuous coating thereon (b) at a rate such that the particles remain free-flowing and (c) the temperature of the particles and time interval between spraying cycles being sufficient to effect solidification of the coating material on the particles before any further spraying.

2. The method of claim 1 in which the adsorbent solid particles are comprised of precipitated silica.

3. The method of claim 1 in which the solid particles are substantially spherical.

4. The method of claim 1 in which the volatile liquid is 2,3-butanedione.

5. The method of claim 1 in which the adsorbed volatile liquid constitutes at least 30% by weight of the adsorbent.

6. The method of claim 1 in which the temperature of the adsorbent during the spraying steps is at least 3 degrees C. below the melting point of the coating material.

7. The method of claim 1 in which the method is conducted within a sigma blade mixer.

8. The method of claim 1 in which the thermoplastic coating material is hydrogenated vegetable oil.

9. The method of claim 8 in which the thermoplastic coating material is hydrogenated soybean oil.

10. The method of claim 8 in which the thermoplastic coating material is paraffin wax.

11. The method of claim 1 in which the spray droplets of volatile liquid are 100 micrometers to 750 micrometers in size.

12. The method of claim 1 in which a layer of further coating material is applied over the impervious thermoplastic coating by admixing therewith a quantity of further coating material at a temperature below the melting point of the initial impervious thermoplastic coating.

13. The method of claim 12 in which the further coating material is applied as a solution in volatile solvent which is removed from the admixture by heating the admixture to effect evaporation of the solvent.

14. The method of claim 12 in which the further coating material is a thermoplastic material which is applied in molten form and the admixture is cooled to effect solidification of the thermoplastic material.

15. The method of claim 1 in which the sprayed layers of thermoplastic coating material constitute 5–50% of the adsorbent weight excluding the adsorbate weight.

16. The method of claim 1 in which the sprayed layers of thermoplastic coating material constitute 20–40% of the adsorbent/adsorbate weight.

17. The method of claim 1 in which the thermoplastic coating material is applied in three steps.

* * * * *